United States Patent
Choi et al.

(10) Patent No.: US 9,253,787 B2
(45) Date of Patent: Feb. 2, 2016

(54) APPARATUS AND METHOD FOR MITIGATING INTER-CELL INTERFERENCE IN CELLULAR COMMUNICATION SYSTEM

(71) Applicant: Samsung Electronics Co., Ltd., Gyeonggi-do (KR)

(72) Inventors: Yun-Seok Choi, Gyeonggi-do (KR); Keun-Chul Hwang, Gyeonggi-do (KR); Hee-Won Kang, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 40 days.

(21) Appl. No.: 14/078,291

(22) Filed: Nov. 12, 2013

(65) Prior Publication Data

US 2014/0135029 A1    May 15, 2014

(30) Foreign Application Priority Data

Nov. 12, 2012  (KR) .......................... 10-2012-0127183

(51) Int. Cl.
*H04W 72/08* (2009.01)
*H04L 5/00* (2006.01)
*H04W 16/00* (2009.01)
*H04J 11/00* (2006.01)

(52) U.S. Cl.
CPC ............ *H04W 72/082* (2013.01); *H04J 11/003* (2013.01); *H04J 11/005* (2013.01); *H04L 5/0032* (2013.01); *H04W 16/00* (2013.01)

(58) Field of Classification Search
USPC .................................. 455/500, 501, 502, 509
See application file for complete search history.

(56) References Cited

U.S. PATENT DOCUMENTS

| | | | | |
|---|---|---|---|---|
| 6,157,811 | A * | 12/2000 | Dent ....................... | H01Q 1/288 455/12.1 |
| 2005/0075112 | A1* | 4/2005 | Ball et al. ................... | 455/456.1 |
| 2009/0180451 | A1 | 7/2009 | Alpert et al. | |
| 2012/0140702 | A1* | 6/2012 | Takano ......................... | 370/315 |

* cited by examiner

*Primary Examiner* — Thomas Lett

(57) ABSTRACT

A method for mitigating inter-cell interference by a base station in a cellular communication system. The base station determines cells to which same frequency resources are allocated, and which cause interference to each other, and determines a starting time slot, at which resource allocation to each cell starts, as a different time slot for each cell, taking into account a number of the cells and time slots constituting time resources. In response to receiving a call setup request from a terminal, the base station selects a time slot taking into account interference information of each of the time slots, and allocates a resource based on the selected time slot to the terminal.

20 Claims, 3 Drawing Sheets

APPARATUS AND METHOD FOR MITIGATING INTER-CELL INTERFERENCE IN CELLULAR COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Nov. 12, 2012 and assigned Serial No. 10-2012-0127183, the entire disclosure of which is incorporated herein by reference.

TECHNICAL FIELD

The present disclosure relates to an apparatus and method for mitigating Inter-Cell Interference (ICI) in a cellular communication system using a synchronous transmission scheme.

BACKGROUND

The Global System for Mobile communication (GSM) system, a wireless network system supporting 3rd Generation Partnership Project (3GPP) GSM-based services, is mobile communication technology that is widely used in the world including Europe, and has evolved into the General Packet Radio Service (GPRS) and Enhanced Data rates for GSM Evolution (EDGE) standards to improve the data transmission capability.

The GSM system uses, as a multiple access scheme, a hybrid scheme of Frequency Division Multiple Access (FDMA) and Time Division Multiple Access (TDMA). In GSM, a physical channel is comprised of a carrier frequency and a time slot, and data is transmitted over a unique time slot in a pre-assigned channel after the data is digitalized and compressed. A user may send and receive multimedia data such as voice and image over the GSM system, and a roaming service is possible between GSM networks.

The GSM system may be operated as a synchronous GSM system and a non-synchronous GSM system. The former matches time synchronization for the frame boundaries and slot boundaries between all cells, using the Global Positioning System (GPS) or the Institute of Electrical and Electronics Engineers (IEEE) 1588 protocol, while the latter does not match synchronization between cells.

In the GSM cellular system, it is important to mitigate inter-cell interference in order to maintain the data quality. The existing GSM system solves the inter-cell interference problems by considering only the resource allocation in the frequency domain.

However, the GSM cellular system using a synchronous transmission scheme may utilize resource allocation not only in the frequency domain but also in the time domain to solve the inter-cell interference problems, due to its possible synchronization between base stations. However, there has been no way to solve the inter-cell interference problems by adjusting the resource allocation in the time domain.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for mitigating inter-cell interference in a cellular communication system using a synchronous transmission scheme.

Another aspect of the present disclosure is to provide an apparatus and method for allocating time resources so as to mitigate inter-cell interference in a cellular communication system using a synchronous transmission scheme.

In accordance with an aspect of the present disclosure, there is provided a method for mitigating inter-cell interference by a base station in a cellular communication system. The method includes determining cells to which same frequency resources are allocated, and which give dominant interference to each other; determining a starting time slot, at which resource allocation to each cell starts, as a different time slot for each cell, taking into account the number of cells and time slots constituting idle time resources; upon receiving a call setup request from a terminal, selecting a time slot taking into account interference information of each of time slots succeeding the starting time slot, for each cell; and allocating the selected time slot to the requested call.

In accordance with another aspect of the present disclosure, there is provided a method for mitigating inter-cell interference by a terminal in a cellular communication system. The method includes sending a call setup request to a base station; and determining a starting time slot, at which resource allocation to each cell starts, as a different time slot for each cell, taking into account the number of cells to which same frequency resources are allocated from the base station, and which give dominant interference to each other, and time slots constituting idle time resources, and being allocated a time slot that is selected taking into account interference information of each of time slots succeeding the starting time slot, for each cell.

In accordance with further another aspect of the present disclosure, there is provided a base station for mitigating inter-cell interference in a cellular communication system. The base station includes a determiner for determining cells to which same frequency resources are allocated, and which give dominant interference to each other, and determining a starting time slot, at which resource allocation to each cell starts, as a different time slot for each cell, taking into account the number of cells and time slots constituting idle time resources; and an allocator for, upon receiving a call setup request from a terminal, selecting a time slot taking into account interference information of each of time slots succeeding the starting time slot, for each cell, and allocating the selected time slot to the requested call.

In accordance with yet another aspect of the present disclosure, there is provided a terminal for mitigating inter-cell interference in a cellular communication system. The terminal includes a transmitter for sending a call setup request to a base station; and a receiver for determining a starting time slot, at which resource allocation to each cell starts, as a different time slot for each cell, taking into account the number of cells to which same frequency resources are allocated from the base station, and which give dominant interference to each other, and time slots constituting idle time resources, and being allocated a time slot that is selected taking into account interference information of each of time slots succeeding the starting time slot, for each cell.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the teen "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although an apparatus and method for mitigating inter-cell interference according to an exemplary embodiment of the present disclosure will be described below in conjunction with the GSM system by way of example, it will be apparent to those of ordinary skill in the art that the proposed apparatus and method for mitigating inter-cell interference may be applied to other communication systems using a synchronous transmission scheme with a slight modification, without departing from the spirit and scope of the disclosure.

Figures 1, 2, 3:
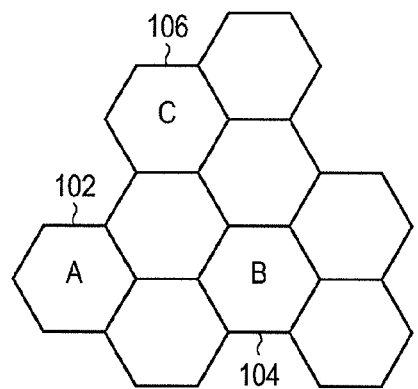
FIG. 1 illustrates an operation of allocating time slot resources to a call by a base station in a cellular communication system using a synchronous transmission scheme.
FIG. 2 illustrates an operation of allocating time slot resources to a requested call by a base station in a cellular communication system using a synchronous transmission scheme.
FIG. 3 illustrates an operation of allocating time slot resources to a requested call by a base station in a cellular communication system using a synchronous transmission scheme according to an exemplary embodiment of the present disclosure.

FIG. 1 illustrates an operation of allocating time slot resources to a call by a base station in a cellular communication system using a synchronous transmission scheme.

Referring to FIG. 1, it will be assumed that the cellular communication system includes nine cells, a frequency reuse factor of the cellular communication system is ⅗, and each cell is comprised of three sectors.

Each of a cell A 102, a cell B 104 and a cell C 106 means a communication area (or coverage) of each Base Transceiver System (BTS). A BTS of each of the cells 102, 104 and 106 may measure average interference signal strength (or interference signal strength) for idle time slots to which no call is assigned, and convert the measured interference signal strength value (for example, Received Signal Level (RXLEV) value) into an Interference Band (IB) value. The interference signal may be an interference signal or a jamming signal from other cells that use the same frequency resources, and the average interference signal strength may be measured every 480 ms. In the GSM system, the received signal level value may be converted into a predetermined number of representative values. In an exemplary embodiment of the present disclosure, the received signal level value may be converted into five representative values, i.e., interference band values IB1 to IB5, as shown in the following Table 1 for example. In Table 1, RXLEV=0 represents lowest interference, and RXLEV=63 represents highest interference.

TABLE 1

| IB1 | IB2 | IB3 | IB4 | IB5 |

RXLEV = 0    X1    X2    X3    X4    RXLEV = 63
Low                                    High
interference                          interference Specifically, if a received signal level value is greater than or equal to 0 and less than X1, the value is converted into IB1. If a received signal level value is greater than or equal to X1 and less than X2, the value is converted into IB2. If a received signal level value is greater than or equal to X2 and less than X3, the value is converted into IB3. If a received signal level value is greater than or equal to X3 and less than X4, the value is converted into IB4. If a received signal level value is greater than or equal to X4 and less than 63, the value is converted into IB5.

In this way, the BTS of each of the cells 102, 104 and 106 may convert the measured interference signal strength value into an interference band value, and transfer the interference band value to a Base Station Controller (BSC). The BSC may receive and store the interference band value.

Thereafter, upon receiving a call setup request from a terminal, the BSC may select a time slot with the lowest interference band value (for example, the lowest measured interference signal strength) taking into account the stored interference band values, and allocate the selected time slot to the requested call.

FIG. 2 illustrates an operation of allocating time slot resources to a requested call by a base station in a cellular communication system using a synchronous transmission scheme.

Referring to FIG. 2, it will be assumed that three cells A, B and C are considered, the cells A, B and C use the same frequency resources, and time slots #0 to #7 allocated to each cell are idle time slots to which no call is assigned.

As described in connection with FIG. 1, upon receiving a call setup request from a terminal, a BSC may select a time slot with the lowest measured interference signal strength from among the idle time slots. Thereafter, the BSC may allocate the selected time slot to the requested call.

However, if call setup requests are simultaneously received from the cells A, B and C that use the same frequency resources, the BSC may allocate the same time slot, for example, a time slot #0 202 to the requested call in each cell, since the BSC cannot use the measured interference signal strength values.

Even if a call setup request is received first from any one of the cells A, B and C, and then, a new call setup request is received from other cells before an interference signal strength measurement cycle of 480 ms, the BSC may allocate the same time slot, for example, the time slot #0 202 to the requested call in each cell, since the BSC cannot use the measured interference signal strength values.

Since the measured interference signal strength values are converted into five interference band values, at least two interference signal strength values included in the same interference band cannot be distinguished, so the BSC may allocate the same time slot to the requested call in each cell.

In this way, the BSC may allocate the same time slot to the requested call in each cell, causing the inter-cell interference. Therefore, a new method will be described below, in which during allocation of time slot resources, the BSC may determine a different starting time slot for each cell, and allocate to a requested call a slot that is selected taking into account an interference band beginning from the starting time slot, so a different time slot for each cell may be allocated to the requested call.

FIG. 3 illustrates an operation of allocating time slot resources to a requested call by a base station in a cellular communication system using a synchronous transmission scheme according to an exemplary embodiment of the present disclosure.

Referring to FIG. 3, it will be assumed that cells A, B and C use the same frequency resources, and time slots #0 to #7 constituting time resources allocated to each cell are idle time slots to which no call is assigned.

A BTS may measure average interference signal strength for each of the idle time slots #0 to #7, and convert the measured average interference signal strength value, for example, received signal level value, into interference band values. The mechanism for converting the received signal level value into interference band values has been described in detail with reference to Table 1, so a detailed description thereof will be omitted. The BTS may transfer the interference band values to the BSC.

The BSC may determine a starting time slot, at which resource allocation to each cell starts, from among the time slots #0 to #7, taking into account the number of cells to which the same frequency resources are allocated, and which give dominant interference to each other. The starting time slot for each cell may be determined as a different time slot for each cell, and the starting time slot determined for each cell may be determined to have the maximum separation distance between starting time slots among given time slot resources, for example, the time slots #0 to #7. Specifically, the BSC may determine a starting time slot #0 302 at which resource allocation to the cell A starts, a starting time slot #3 304 at which resource allocation to the cell B starts, and a starting time slot #6 306 at which resource allocation to the cell C starts, taking into account the number (for example, three) of cells to which the same frequency resources are allocated, and which give dominant interference to each other. In FIG. 3, the number of cells to which the same frequency resources are allocated, and which give dominant interference to each other, is assumed to be three. However, the time slot resource allocation method described in connection with FIG. 3 may be applied to any cases, as long as the number of cells to which the same frequency resources are allocated, and which give dominant interference to each other, is plural. For example, if the number of cells to which the same frequency resources are allocated, and which give dominant interference to each other, is two, starting time slots at which resource allocations to the two cells start, may be determined as slots #0 and #4, respectively. If the number of cells to which the same frequency resources are allocated, and which give dominant interference to each other, is four, starting time slots at which resource allocations to the four cells start, may be determined as time slots #0, #2, #4 and #6, respectively.

The BSC may store interference band values transmitted from the BTSs, and upon receiving a call setup request from a terminal, the BSC may select a time slot with the lowest interference band value, taking into account the interference band value of each of time slots succeeding the determined starting time slot.

Specifically, upon receiving a call setup request from a terminal, the BSC, in case of the cell A, may select a time slot with the lowest interference band value, taking into account the interference band value corresponding to each of time slots (#1→#2→#3→#4→#5→#6→#7) succeeding the starting time slot #0 302, and allocate the selected time slot to the requested call. In case of the cell B, the BSC may select a time slot with the lowest interference band value, taking into account the interference band value corresponding to each of time slots (#4→#5→#6→#7→#0→#1→#2) succeeding the starting time slot #3 304, and allocate the selected time slot to the requested call. In case of the cell C, the BSC may select a time slot with the lowest interference band value, taking into account the interference band value corresponding to each of time slots (#7→#0→#1→#2→#3→#1→#5) succeeding the starting time slot #6 306, and allocate the selected time slot to the requested call.

In FIG. 3, the BTS and BSC operations have been described separately. However, the BTSs and the BSC may be components of a base station, and in this case, the above-described BTS and BSC operations may be performed in the base station.

Figure 4:
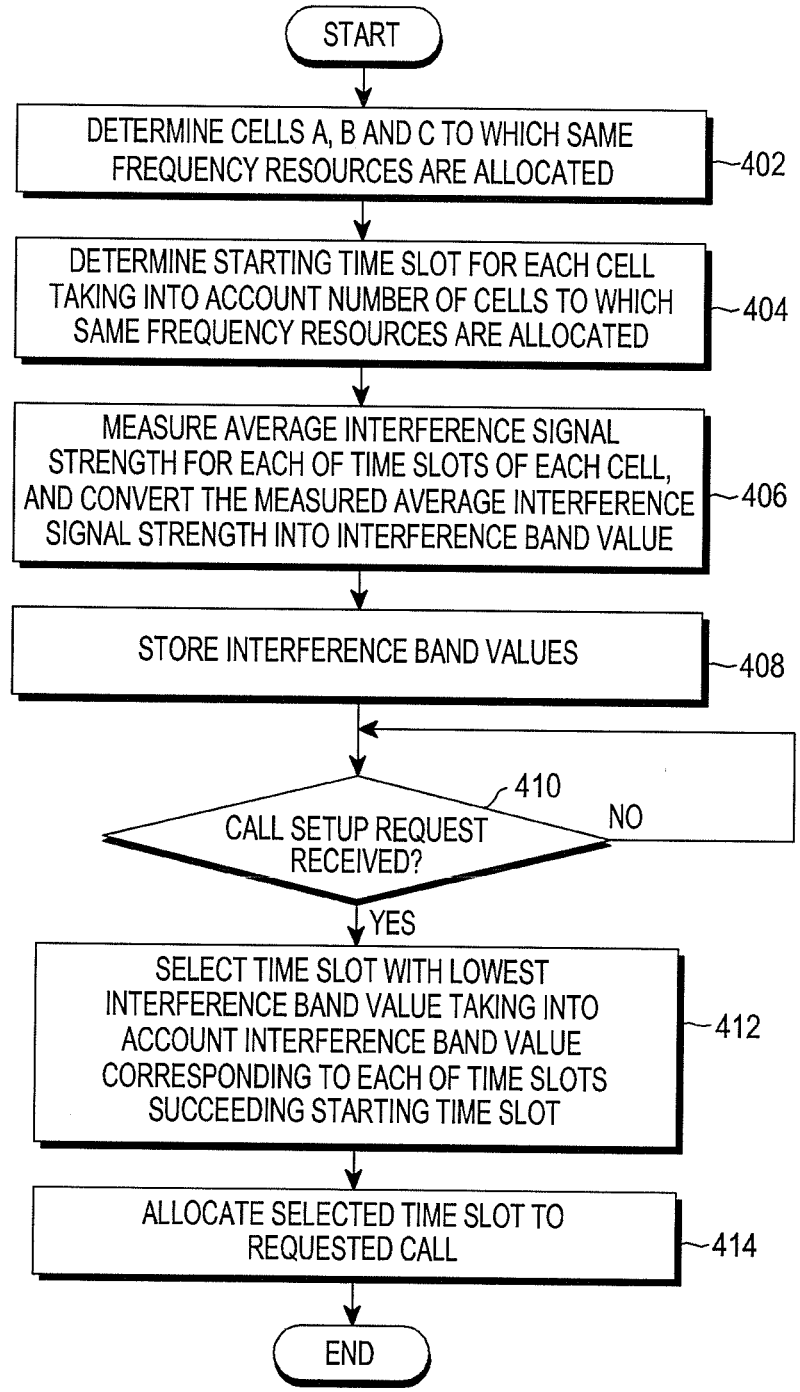
FIG. 4 illustrates a flowchart for a process of allocating time slot resources to a requested call by a base station in a cellular communication system using a synchronous transmission scheme according to an exemplary embodiment of the present disclosure.

FIG. 4 illustrates a flowchart for a process of allocating time slot resources to a requested call by a base station in a cellular communication system using a synchronous transmission scheme according to an exemplary embodiment of the present disclosure.

Referring to FIG. 4, in step 402, the base station may determine cells A, B and C to which the same frequency resources are allocated, and which give dominant interference to each other. In step 404, the base station may determine a starting time slot, at which resource allocation to each cell starts, taking into account the number (i.e., three) of cells to which the same frequency resources are allocated, and which give dominant interference to each other. The starting time slot for each cell may be determined as a different time slot for each cell, and the starting time slot determined for each cell may be determined to have the maximum separation distance between starting time slots among given time slot resources.

In step 406, the base station may measure average interference signal strength for each of the time slots of each cell, and convert the measured average interference signal strength into interference band values. In step 408, the base station may store and manage the interference band values. The time slots of each cell mean idle time slots to which no call is assigned, and the interference band value means a value that is obtained by mapping the measured average interference signal strength to any one of a plurality of predetermined interference bands.

Thereafter, the base station may determine in step 410 whether a call setup request is received from a terminal. If no call setup request is received, the base station may repeat step 410. Otherwise, upon receiving the call setup request, the base station may proceed to step 412.

In step 412, for each cell, the base station may select a time slot with the lowest interference band value, taking into account the interference band value corresponding to each of time slots succeeding the starting time slot that was determined in step 404. In step 414, the base station may allocate the selected time slot to the requested call, for each cell.

Figure 5:
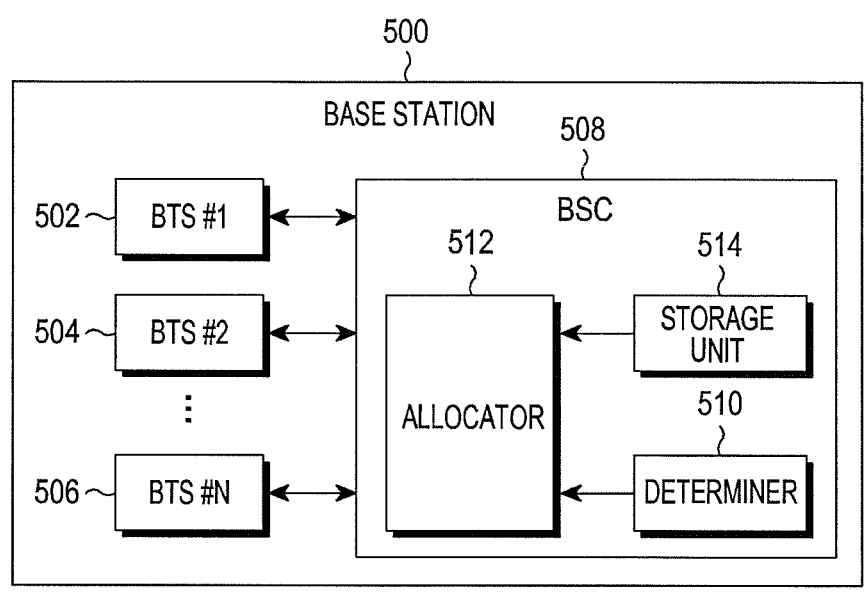
FIG. 5 illustrates a block diagram of a base station allocating time slot resources to a requested call in a cellular communication system using a synchronous transmission scheme according to an exemplary embodiment of the present disclosure.

FIG. 5 illustrates a block diagram of a base station allocating time slot resources to a requested call in a cellular communication system using a synchronous transmission scheme according to an exemplary embodiment of the present disclosure.

Referring to FIG. 5, a base station 500 includes a plurality of BTSs, i.e., first to N-th BTSs 502, 504 and 506, and a BSC 508. The BSC 508 includes a determiner 510, an allocator 512, and a storage unit 514.

The determiner 510 in the BSC 508 may determine first to N-th cells to which the same frequency resources are allocated, and determine a starting time slot for each cell, taking into account the number of cells to which the same frequency resources are allocated, and which give dominant interference to each other.

Each of the first to N-th BTSs 502, 504 and 506 that manage the first to N-th cells, respectively, may measure average interference signal strength for each of the idle time slots to which no call is assigned in its cell, convert the measured average interference signal strength into interference band values, and transfer the interference band values to the BSC 508.

The BSC 508 may store the interference band values in the storage unit 514. Thereafter, upon receiving a call setup request from a terminal, the allocator 512 in the BSC 508 may select a time slot with the lowest interference band value, taking into account the interference band value corresponding to each of time slots succeeding the determined starting time slot for each cell, and allocate the selected time slot to the requested call.

It can be appreciated that the method for mitigating inter-cell interference according to an exemplary embodiment of the present disclosure may be implemented by hardware, software or a combination thereof. The software may be stored in a volatile or non-volatile storage (for example, erasable or re-writable Read Only Memory (ROM)), a memory (for example, Random Access Memory (RAM), memory chip, memory device, or memory Integrated Circuit (IC)), or an optically or magnetically recordable machine (or computer)-readable storage medium (for example, Compact Disk (CD), Digital Versatile Disk (DVD), magnetic disk, or magnetic tape). The inter-cell interference mitigation method may be implemented by a computer or a mobile terminal that includes a controller and a memory, and the memory may be an example of a machine-readable storage medium suitable to sore a program or programs including instructions for implementing exemplary embodiments of the present disclosure.

Therefore, the present disclosure may include a program including code for implementing the apparatus and method as defined by the appended claims, and a machine (or computer)-readable storage medium storing the program. The program may be electronically transferred via any media such as communication signals which are transmitted through wired/wireless connections, and the present disclosure may include their equivalents.

The apparatus for mitigating inter-cell interference according to an exemplary embodiment of the present disclosure may receive and store the program from a program server to which the apparatus is connected by wire or wirelessly. The program server may include a memory for storing a program including instructions for implementing the inter-cell interference mitigation method, and storing information needed for the inter-cell interference mitigation method, a communication unit for performing wired/wireless communication with the inter-cell interference mitigation apparatus, and a controller for transmitting the program to the inter-cell interference mitigation apparatus upon request or automatically.

As is apparent from the foregoing description, in a cellular communication system using a synchronous transmission scheme, during allocation of time slot resources, a base station may allocate to the requested call a different time slot for each cell to which the same frequency resources are allocated, thereby mitigating the inter-cell interference and improving the signal quality.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for mitigating inter-cell interference by a base station in a cellular communication system, the method comprising:
    detecting cells to which same frequency resources are allocated;
    determining a starting time slot, at which resource allocation to each of the cells starts, as a different time slot for each of the cells based on a number of the detected cells and time slots constituting time resources of a related cell;
    in response to receiving a call setup request from a terminal, selecting a time slot based on the starting time slot and interference information of each of the time slots; and
    allocating a resource based on the selected time slot to the terminal.

2. The method of claim 1, wherein the starting time slot for each of the cells is determined to have a maximum separation distance between starting time slots in a time domain.

3. The method of claim 1, further comprising:
    measuring a received signal level value related to average interference signal strength for each of the time slots succeeding the starting time slot; and
    converting the received signal level value into an interference band value.

4. The method of claim 3, further comprising storing and managing the interference band values for each of the cells.

5. The method of claim 3, wherein converting the received signal level value into the interference band value comprises converting the received signal level value into the interference band value related to an interference band mapped thereto among a plurality of predetermined interference bands.

6. The method of claim 3, wherein selecting the time slot comprises selecting the time slot with a lowest interference band value among the time slots succeeding the starting time slot.

7. The method of claim 1, wherein the time resources are idle time resources to which no call is assigned.

8. A method for mitigating inter-cell interference by a terminal in a cellular communication system, the method comprising:
    sending a call setup request to a base station; and
    performing a call setup based on a resource being allocated by the base station,
    wherein the resource is allocated based on a time slot, and the time slot is selected based on a starting time slot and interference information of each of time slots, and
    wherein the starting time slot at which resource allocation to each cell starts is determined as a different time slot for each cell based on a number of cells to which same frequency resources are allocated and the time slots constituting time resources of a related cell.

9. The method of claim 8, wherein a starting time slot for each cell is determined to have a maximum separation distance between starting time slots in a time domain.

10. The method of claim 8, wherein the time resources are idle time resources to which no call is assigned.

11. A base station for mitigating inter-cell interference in a cellular communication system, the base station comprising:
    a determiner configured to detect cells to which same frequency resources are allocated, and determine a starting time slot, at which resource allocation to each of the cells starts, as a different time slot for each of the cells based on a number of the detected cells and time slots constituting time resources of a related cell; and
    an allocator configured to, in response to receiving a call setup request from a terminal, select a time slot based on the starting time slot and interference information of each of the time slots, and allocate a resource based on the selected time slot to the terminal.

12. The base station of claim 11, wherein the determiner is configured to determine the starting time slot for each cell to have a maximum separation distance between starting time slots in a time domain.

13. The base station of claim 11, further comprising a transceiver configured to measure a received signal level value related to average interference signal strength for each of the time slots and convert the received signal level value into an interference band value.

14. The base station of claim 13, further comprising a storage unit configured to store and manage the interference band values for each of the cells.

15. The base station of claim 13, wherein the transceiver is further configured to convert the received signal level value into the interference band value related to an interference band mapped thereto among a plurality of predetermined interference bands.

16. The base station of claim 13, wherein the allocator is further configured to select the time slot with the lowest interference band value among the time slots succeeding the starting time slot.

17. The base station of claim 11, wherein the time resources are idle time resources to which no call is assigned.

18. A terminal for mitigating inter-cell interference in a cellular communication system, the terminal comprising:
    a transmitter configured to send a call setup request to a base station; and
    a controller configured to perform a call setup based on a resource being allocated by the base station,
    wherein the resource is allocated based on a time slot, and the time slot is selected based on a starting time slot and interference information of each of the time slots, and
    wherein the starting time slot at which resource allocation to each cell starts is determined as a different time slot for each cell based on a number of cells to which same frequency resources are allocated and the time slots constituting time resources of a related cell.

19. The terminal of claim 18, wherein a starting time slot for each cell is determined to have a maximum separation distance between starting time slots in a time domain.

20. The terminal of claim 18, wherein the time resources are idle time resources to which no call is assigned.

* * * * *